United States Patent
Ippatapu et al.

(10) Patent No.: US 10,261,708 B1
(45) Date of Patent: Apr. 16, 2019

(54) HOST DATA REPLICATION ALLOCATING SINGLE MEMORY BUFFERS TO STORE MULTIPLE BUFFERS OF RECEIVED HOST DATA AND TO INTERNALLY PROCESS THE RECEIVED HOST DATA

(71) Applicant: EMC IP Holding Company LLC, Hopkinton, MA (US)

(72) Inventors: Venkata Ippatapu, Westborough, MA (US); Kenneth M. Dorman, West Brookfield, MA (US); Ilya Garelik, Sudbury, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 94 days.

(21) Appl. No.: 15/497,804

(22) Filed: Apr. 26, 2017

(51) Int. Cl.
| | |
|---|---|
| *G06F 3/06* | (2006.01) |
| *G06F 12/0868* | (2016.01) |
| *G06F 13/16* | (2006.01) |
| *G06F 13/28* | (2006.01) |
| *G06F 15/173* | (2006.01) |

(52) U.S. Cl.
CPC .......... *G06F 3/0619* (2013.01); *G06F 3/0604* (2013.01); *G06F 3/065* (2013.01); *G06F 3/067* (2013.01); *G06F 3/0631* (2013.01); *G06F 3/0656* (2013.01); *G06F 12/0868* (2013.01); *G06F 13/1673* (2013.01); *G06F 13/28* (2013.01); *G06F 15/17331* (2013.01); *G06F 2212/1016* (2013.01); *G06F 2212/154* (2013.01); *G06F 2212/604* (2013.01)

(58) Field of Classification Search
None
See application file for complete search history.

(56) References Cited

U.S. PATENT DOCUMENTS

| | | | |
|---|---|---|---|
| 7,864,806 B2 | 1/2011 | Qiu et al. | |
| 8,306,062 B1 * | 11/2012 | Cohen | H04L 69/161 370/473 |
| 8,477,806 B2 | 7/2013 | Qiu et al. | |
| 8,996,718 B2 | 3/2015 | Biswas | |

(Continued)

OTHER PUBLICATIONS

Friend, R., "Transport Layer Security (TLS) Protocol Compression Using Lempel-Ziv-Stac (LZS)", Network Working Group; RFC 3943; Nov. 2004, 27 pages.

(Continued)

*Primary Examiner* — Michael Sun
(74) *Attorney, Agent, or Firm* — BainwoodHuang

(57) ABSTRACT

On a local data storage system, a single buffer of contiguous local memory is allocated to store host data from multiple received host data buffers in a local cache, and local internal data processing operations may be performed on the host data with local data processing resources using the single buffer of contiguous local memory in the local memory to store the host data. On a remote data storage system onto which the host data is replicated, a single buffer of contiguous remote memory is allocated to store host data from multiple transmission units used to convey the host data to the remote data storage system, and remote internal data processing operations may be performed on the host data by one or more remote data processing resources using the single buffer of contiguous remote memory to store the host data from the received transmission units.

21 Claims, 6 Drawing Sheets

(56) References Cited

U.S. PATENT DOCUMENTS

| | | | |
|---|---|---|---|
| 9,300,578 B2 | 3/2016 | Chudgar et al. | |
| 9,384,033 B2 | 7/2016 | Jain et al. | |
| 9,672,062 B1* | 6/2017 | Tsirkin | G06F 9/45558 |
| 2011/0060887 A1* | 3/2011 | Thatcher | G06F 3/0604 |
| | | | 711/171 |
| 2011/0296133 A1* | 12/2011 | Flynn | G06F 11/1048 |
| | | | 711/171 |
| 2013/0073821 A1* | 3/2013 | Flynn | G06F 3/061 |
| | | | 711/162 |
| 2013/0185475 A1* | 7/2013 | Talagala | G06F 12/0866 |
| | | | 711/102 |
| 2013/0227236 A1* | 8/2013 | Flynn | G11C 16/26 |
| | | | 711/165 |

OTHER PUBLICATIONS

Geremia, Patrick, "Cyclic Redundancy Check Computation: An Implementation Using the TMS320C54x", Texas Instruments Application Report SPRA530, Digital Processing Solutions, Apr. 1999, 35 pages.

Milekic, Bosko, "Network Buffer Allocation in the FreeBSD Operating System", <<https://www.bsdcan.org/2004/papers/NetworkBufferAllocation.pdf>> May 2004, 13 pages.

Murray et al., "Large MTUs and Internet Performance", High Performance Switching and Routing (HPSR) Conference held Jun. 24-27, 2012, IEEE, Aug. 6, 2012, 6 pages.

\* cited by examiner

HOST DATA REPLICATION ALLOCATING SINGLE MEMORY BUFFERS TO STORE MULTIPLE BUFFERS OF RECEIVED HOST DATA AND TO INTERNALLY PROCESS THE RECEIVED HOST DATA

TECHNICAL FIELD

The present disclosure relates generally to intelligent data storage systems, and more specifically to technology for performing host data replication that includes allocating single memory buffers to store multiple buffers of received host data and to internally process the received host data.

BACKGROUND

Data storage systems contain one or more non-volatile storage devices, such as magnetic disk drives, electronic flash drives, and/or optical drives, and are used by one or more host devices ("hosts") to store data to and retrieve host data from the non-volatile storage devices they contain. Specifically, data storage systems process host read and write input/output ("I/O") operations they receive from hosts. The host I/O operations indicate host data to be read from or written to the non-volatile storage devices contained in the data storage systems. Data storage systems include hardware and software that receives and processes incoming host I/O operations, and that organizes and secures the host data that is stored on behalf of the host devices on the non-volatile storage devices contained in the storage arrays.

Fault tolerance is an important consideration for data storage systems. Some previous systems have replicated host across multiple data storage systems, in order to provide fault tolerance.

The time that elapses between when a host issues an I/O operation to the data storage system and when the I/O operation completes is experienced as I/O latency by the host. I/O latency is an important performance consideration with regard to data storage systems.

SUMMARY

Previous systems for replicating host data across multiple data storage systems have exhibited significant shortcomings in terms of I/O latency. Some previous data storage systems have performed internal processing on host data that is replicated across different data storage systems by allocating and using discontiguous memory buffers having sizes that reflect the data usage patterns of the specific host applications that use the data storage system. Previous data storage systems have also performed internal processing on host data they receive for replication by allocating and using discontiguous memory buffers having sizes that equal the size of the maximum transmission unit (MTUs) for the network located between the local data storage system and the remote data storage system. These previous approaches have resulted in processing being performed on host data using large numbers of small memory buffers. Since internal processing operations of host data are often performed on a per buffer basis, and incur processing overhead for each buffer processed, large amounts of processing overhead have resulted from these previous approaches, causing large amounts of I/O latency to be experienced by the hosts that use the data storage systems.

To address these and other shortcomings of previous systems, improved technology is disclosed herein for performing host data replication between a local data storage system and a remote data storage system. In the disclosed technology, host data received from one or more host computers is stored into multiple, discontiguous, received host data buffers within a local cache of a local data storage system. The local cache is communicably coupled to non-volatile storage devices of the local data storage system, and the contents of the received host data within the local cache is also stored in the non-volatile storage devices of the local data storage system in order to persistently store the contents of the received host data in the local data storage system. A local data buffer location list is generated having multiple entries. Each entry in the local data buffer location list indicates a location of a corresponding one of the received host data buffers in the local cache. In response to the local data buffer location list, the local data storage system allocates a single buffer of contiguous local memory in a local memory within the local data storage system. The single buffer of contiguous local memory has a size that is at least as large as a total size of all the received host data buffers. The local data storage system performs at least one local internal data processing operation on the host data with at least one local data processing resource within the local data storage system while using the single buffer of contiguous local memory in the local memory to store the host data from the received host data buffers.

In another aspect of the disclosed technology, the local data processing resource may consist of or include local direct memory access circuitry coupled to the local cache and the memory of the local data storage system, and the local internal data processing operation may consist of or include moving the host data from the host data buffers in the local cache to the single buffer of contiguous local memory using the local direct memory access circuitry.

In another aspect of the disclosed technology, moving the host data from the host data buffers in the local cache to the single buffer of contiguous local memory may consist of or include i) indicating, responsive to the entries in the local data buffer location list, the locations of the received host data buffers in the local cache to the local direct memory access circuitry, ii) indicating a location of the single buffer of contiguous local memory in the memory of the local data storage system to the local direct memory access circuitry, and iii) triggering the local direct memory access circuitry to begin moving the host data from the received host data buffers in the local cache to the single buffer of contiguous local memory.

In another aspect of the disclosed technology, the local data processing resource may consist of or include local data compression circuitry coupled to the memory of the local data storage system, and the local internal data processing operation may consist of or include compressing the host data in the single buffer of contiguous local memory using the local data compression circuitry.

In another aspect of the disclosed technology, compressing the host data in the single buffer of contiguous local memory may consist of or include i) indicating the location of the single buffer of contiguous local memory in the memory of the local data storage system to the local data compression circuitry coupled to the memory of the local data storage system, and ii) triggering the local data compression circuitry to begin compressing the host data in the single buffer of contiguous local memory.

In another aspect of the disclosed technology, the local data processing resource may consist of or include a local central processing unit, and the local internal data processing operation may consist of or include executing a network controller module on the local central processing unit to add network header information to the host data in the single buffer of contiguous memory in the memory of the local data storage system. The network header information may consist of or include mapping information indicating locations within a remote cache of the remote data storage system into which the host data is to be stored.

In another aspect of the disclosed technology, the local internal data processing operation may consist of or include executing a TCP/IP module on the local central processing unit to perform a large send offload operation using a local network interface card in the local data storage system by passing the single buffer of contiguous memory to the local network interface card to cause the local network interface card to i) divide the contents of the single buffer of contiguous memory into transmission units, and ii) transmit the transmission units to the remote data storage system.

In another aspect of the disclosed technology, the transmission units may be received by the remote data storage system, and the remote data storage system may allocate a single buffer of contiguous remote memory in a memory of the remote data storage system having a size that is at least as large as a total size of the received transmission units. The remote data storage system may then perform one or more remote internal data processing operations on the host data with at least one remote data processing resource within the remote data storage system while using the single buffer of contiguous remote memory to store the host data from the received transmission units.

In another aspect of the disclosed technology, the remote data processing resource may consist of or include remote data decompression circuitry coupled to the memory of the remote data storage system, and the internal data processing operation may consist of or include decompressing the host data in the single buffer of contiguous remote memory using the remote data decompression circuitry.

In another aspect of the disclosed technology, the remote data storage system may generate, from the mapping information in the network header information, a remote data buffer location list having multiple entries. Each entry in the remote data buffer location list may indicate one of the locations within the remote cache of the remote data storage system into which the replicated host data is to be stored. The replicated host data in the remote cache may be stored into non-volatile storage of the remote data storage system to persistently replicate the host data on the remote data storage system. The remote data processing resource may consist of or include remote direct memory access circuitry coupled to the remote cache and the memory of the remote data storage system. The remote internal data processing operation may consist of or include moving the host data from the single buffer of contiguous remote memory to the locations within the remote cache of the remote data storage system into which the replicated host data is to be stored, in response to the entries in the remote data buffer location list.

Embodiments of the disclosed techniques may provide significant advantages over previous approaches. For example, in contrast to previous systems in that performed internal processing on host data that is replicated across different data storage systems by allocating and using discontiguous memory buffers having sizes that reflect the data usage patterns of the specific host applications that use the data storage system, and/or that performed internal processing on host data received for replication by allocating and using discontiguous memory buffers having sizes that equal the size of the maximum transmission unit (MTUs) for the network located between the local data storage system and the remote data storage system, the disclosed technology allocates a single buffer of contiguous local memory to store host data from multiple received host data buffers, and performs at least one local internal data processing operation on the host data with at least one local data processing resource within the local data storage system while using the single buffer of contiguous local memory in the local memory to store the host data from the received host data buffers. On the remote data storage system onto which the host data is replicated, the disclosed technology allocates a single buffer of contiguous remote memory to store host data from multiple transmission units used to convey the host data to the remote data storage system. Remote internal data processing operations may then be performed on the host data by one or more remote data processing resources using the single buffer of contiguous remote memory to store the host data from the received transmission units. In this way the disclosed technology reduces the number of memory buffers that are processed by the internal data processing resources in both the local and remote data storage systems, thus reducing the amount of per-buffer overhead processing performed by such data processing resources, resulting in quicker completion of I/O operations by the local and remote data storage systems, including the replication of host write data from the local data storage system to the remote data storage system, resulting smaller amounts of I/O latency being experienced by hosts that issue host I/O write operations to store host data on the local data storage systems that is also replicated on the remote data storage system.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

Embodiments of the invention will now be described. It should be understood that the embodiments are provided by way of example to illustrate various features and principles of the disclosed technology, and that the claimed invention is broader than the specific examples of embodiments described below.

Figure 1:
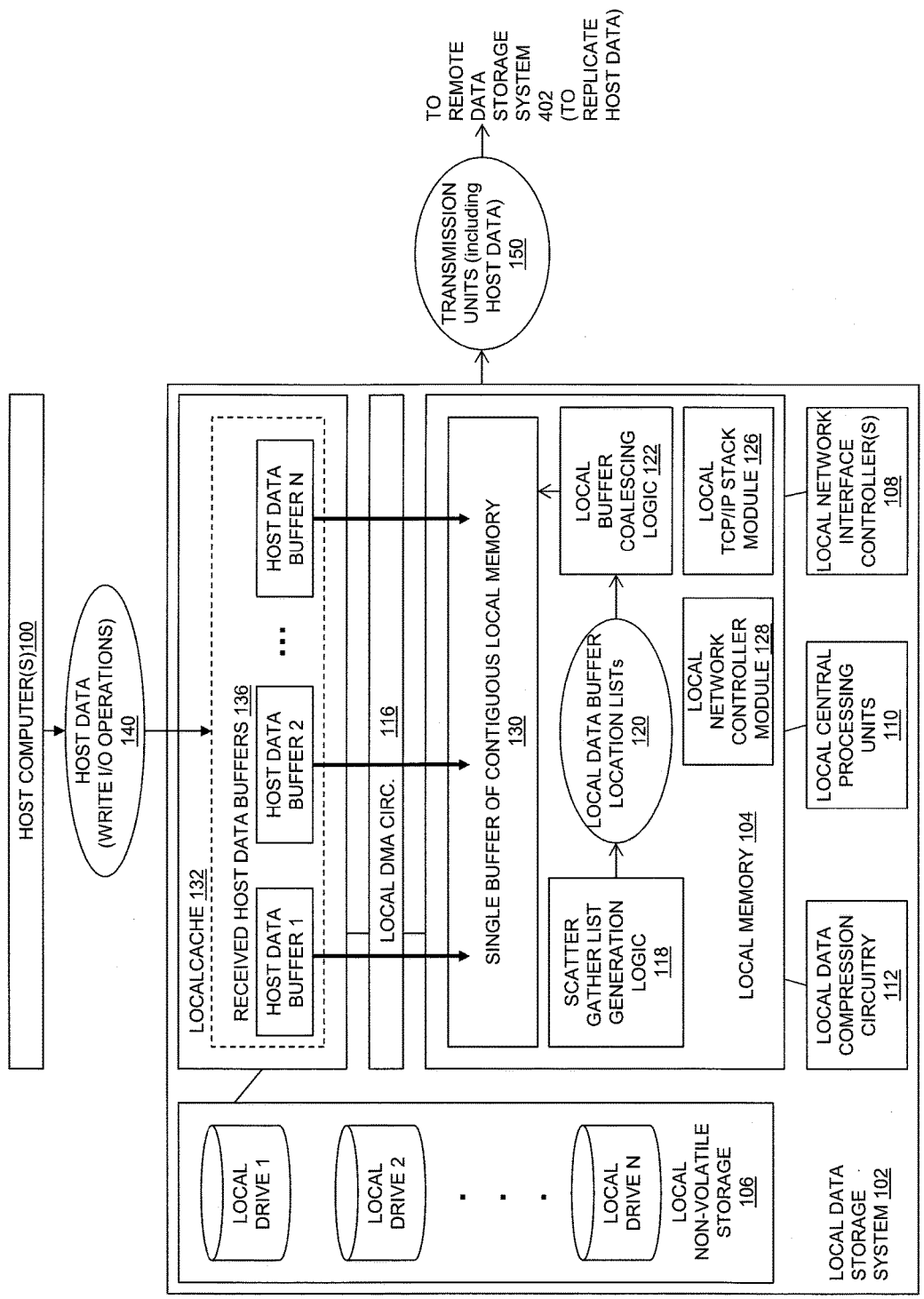
FIG. 1 is a block diagram illustrating an example of a local data storage system in some embodiments.
Figure 4:
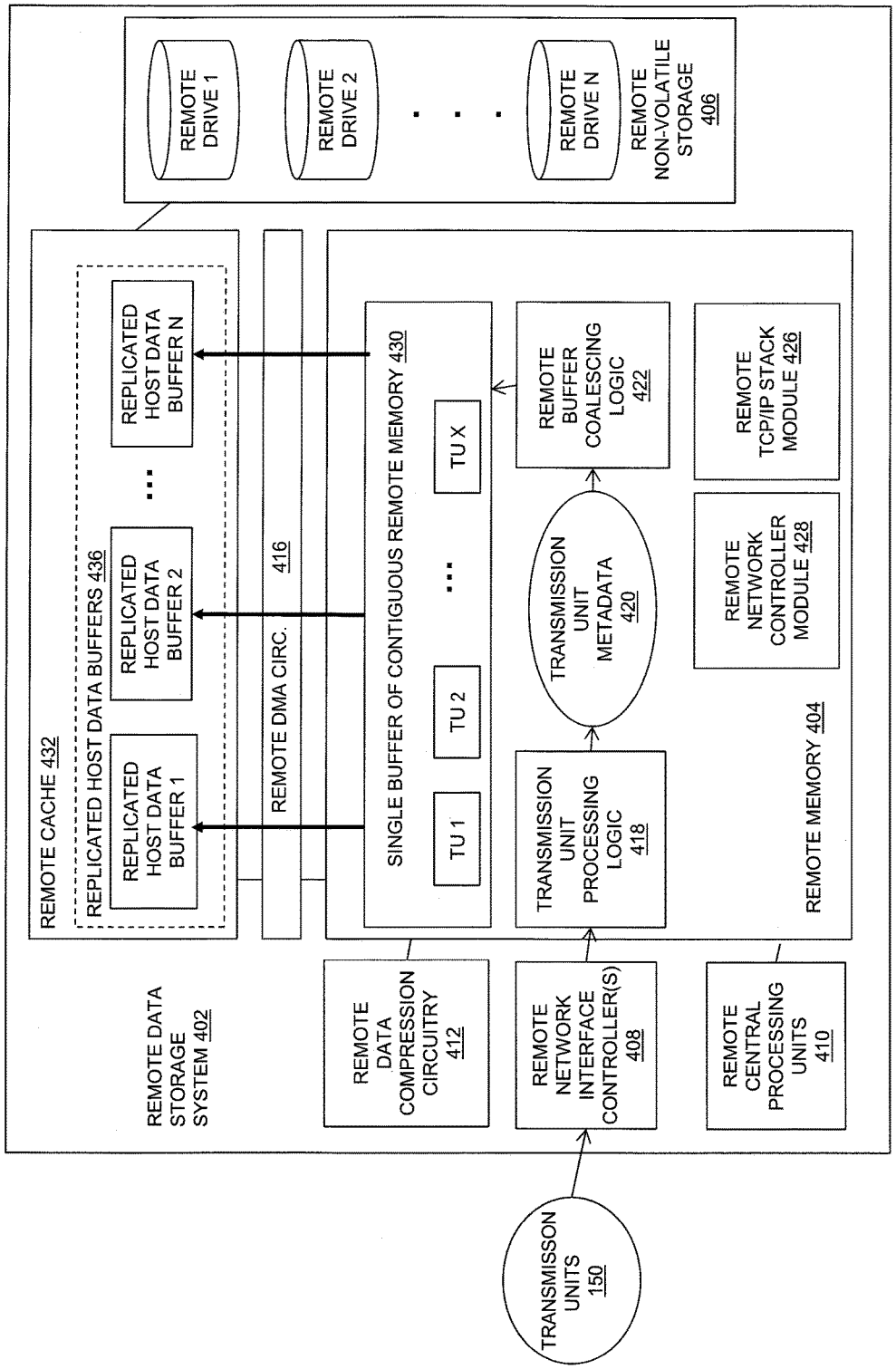
FIG. 4 is a block diagram illustrating an example of a remote data storage system in some embodiments.

FIG. 1 shows an example of a local data storage system in some embodiments. As shown in FIG. 1, one or more Host Computer(s) 100 may be communicably connected, e.g. over one or more communication networks, with a Local Data Storage System 102. Host Computer(s) 100 may consist of or include any specific type of computer, computer system, or group of computers, that is operable to issue I/O operations, such as I/O write operations and/or I/O read operations. Host Computer(s) 100 may be communicably coupled to Local Data Storage System 102 over any specific type of communication network or networks, such as a local area network (LAN), and/or a wide area network (WAN) such as the Internet, etc. In one example, Local Data Storage System 102 is considered "local" in that it is located in relatively close geographic proximity to Host Computer(s) 100, e.g. within the same building, campus, city, town, etc. In such an example, a remote data storage system, e.g. Remote Data Storage System 402 shown in FIG. 4, is considered "remote", in that it is located at a significantly greater geographic distance from Host Computer(s) 100, e.g. in another county, state, country, etc. Locating Remote Data Storage System 402 geographically remotely from Local Data Storage System 102 may provide disaster recovery protection, in that Remote Data Storage System 402 is less likely to be adversely affected (e.g. destroyed, caused to fail, etc.) by certain types of disasters (e.g. earthquakes, other natural disasters) that have an impact proximate to Local Data Storage System 102, and that accordingly may cause destruction or failure of Local Data Storage System 102, but not Remote Data Storage System 402. Advantageously, host data replicated onto Remote Data Storage System 402 may survive a disaster that causes the loss of data stored on Local Data Storage System 102.

As shown in FIG. 1, Local Data Storage System 102 includes Local Non-Volatile Storage 106 for persistently storing the Host Data 140 that is received from Host Computer(s) 100, e.g. from one or more applications executing on Host Computer(s) 100. Host Data 140 may, for example, consist of host data indicated by write I/O operations directed to Local Data Storage System 102. Accordingly, Host Computer(s) 100 transmit Host Data 140 to Local Data Storage System 102 so that Host Data 140 will be persistently stored in Local Non-Volatile Storage 106, and so that Host Data 140 will also be replicated in the Remote Non-Volatile Storage 406 of Remote Data Storage System 402. Local Non-Volatile Storage 106 may include a number of local data storage drives, e.g. Local Drive 1, Local Drive 2, and so on through Local Drive N. The local data storage drives in Local Non-Volatile Storage 106 may include or consist of one or more magnetic disk drives, electronic flash drives, and/or optical drives.

The Local Data Storage System 102 is further shown including a Local Memory 104, Local Network Interface Controller(s) 108, Local Central Processing Units 110, Local Data Compression Circuitry 112, Local Direct Memory Access Circuitry 116, and Local Cache 132.

Local Network Interface Controller(s) 108 may include or consist of one or more network interface controllers, each of which is a computer hardware component that connects Local Data Storage System 102 to one or more computer networks through which Local Data Storage System 102 is communicably connected to Host Computer(s) 100 and/or Remote Data Storage System 402, and operates to transmit and/or receive electronic and/or optical signals over such networks. Local Network Interface Controller(s) 108 may include the ability to perform Large Send Offload Operations (LSO) that perform TCP segmentation by splitting large amounts of data (e.g. a total amount of host data stored in the Single Buffer of Contiguous Memory 130) into packets and then transmitting the resulting packets (e.g. as Transmission Units 150) to the Remote Data Storage System 402.

Local Central Processing Units 110 may, for example, each include or consist of one or more microprocessors, e.g. central processing units (CPUs), multi-core processors, chips, and/or assemblies, and associated circuitry.

Local Data Compression Circuitry 112 is a computer hardware component that is operable to compress and/or decompress data stored in Local Memory 104. Local Data Compression Circuitry 112 may, for example, be operable to perform Lempel-Ziv-Stac (LZS) lossless data compression on data stored in Local Memory 104 (e.g. on host data stored in Single Buffer of Contiguous Local Memory 130), in response to program logic stored in Local Memory 104 and executing on one or more of the Local Central Processing Units 110.

Local Direct Memory Access (DMA) Circuitry 116 is a computer hardware component operable to perform a local internal data processing operation on the host data stored in Single Buffer of Contiguous Local Memory 130 by performing a high speed data transfer from Local Cache 132 to Local Memory 104, independent from Local Central Processing Units 110. For example, Local Buffer Coalescing Logic 122 executing on Local Central Processing Units 110 may initiate a data transfer of Received Host Data Buffers 136 from Local Cache 132 into the Single Buffer of Contiguous Local Memory 130 in Local Memory 104 using Local DMA Circuitry 116, and then subsequently receive an interrupt or other notification from Local DMA Circuitry 116 when the data transfer is complete.

Local Cache 132 may be embodied as a high speed data storage hardware component that is operable to initially store host data received from Host Computers 100. The received host data initially contained in Local Cache 132 is also persistently stored from Local Cache 132 into Local Non-Volatile Storage 106.

Local Memory 104 may include volatile memory (e.g., RAM), and/or non-volatile memory, such as one or more ROMs, disk drives, solid state drives, and the like. The Local Central Processing Units 110 and Local Memory 104 form control circuitry, which is constructed and arranged to carry out various methods and functions as described herein. Local Memory 104 may store a variety of software components that may be provided in the form of executable program code. For example, as shown in FIG. 1, Local Memory 104 may include software components such as Scatter Gather List Generation Logic 118, Local Buffer Coalescing Logic 122, Local TCP/IP Stack Module 126, and Local Network Controller Module 128. When the program code in Local Memory 104 is executed by processing circuitry in Local Central Processing Units 110, the processing circuitry may be caused to carry out the operations of the software components, and to carry out the methods and functions of the Local Data Storage System 102 as described herein. The software components may alternatively be embodied as firmware, microcode, and/or hardware circuitry operable to carry out the methods and functions described herein. Although certain software components are shown and described for purposes of illustration and explanation, those skilled in the art will recognize that the Local Memory 104 may additionally or alternatively include various other software components, such as an operating system, and various other applications, processes, etc.

Local Network Controller Module 128 may be embodied as program logic operable to process the host data stored in Single Buffer of Contiguous Local Memory 130 by adding network module header information to the host data contained in the Single Buffer of Contiguous Local Memory 130, in preparation for transmitting the host data contained in the Single Buffer of Contiguous Local Memory 130 to Remote Data Storage System 402 in order to replicate the host data contained in the Single Buffer of Contiguous Local Memory 130, and before the Single Buffer of Contiguous Local Memory 130 is passed to Local TCP/IP Stack Module 126. Such network module header information that may be added by Local Network Controller Module 128 may include i) an original size (we-compression) of the host data stored in Single Buffer of Contiguous Local Memory 130, ii) a size of the compressed version of the host data stored in Single Buffer of Contiguous Local Memory 130, iii) information specific to the Local Data Storage System 102 such as a transaction number and/or connection information such as IP (Internet Protocol) addresses of the Local Data Storage System 102 and Remote Data Storage System 402, iv) mapping information metadata indicating the locations within the Remote Cache 432 of Remote Data Storage System 402 into which the host data from Single Buffer of Contiguous Local Memory 130 should be replicated, and v) CRC (Cyclic Redundancy Code) checksum(s) for the host data.

Local TCP/IP Stack Module 126 may be embodied as program logic operable to process the host data stored in Single Buffer of Contiguous Local Memory 130 by passing the host data stored in Single Buffer of Contiguous Memory 130 to Local Network Interface Controller(s) 108 to cause Local Network Interface Controller(s) 108 to perform a Large Send Offload (LSO) operation on the host data stored in the Single Buffer of Contiguous Memory 130.

Scatter Gather List Generation Logic 118 includes or consists of program logic operable to generate Local Data Buffer Location Lists 120, and to pass Local Data Buffer Location Lists 120 to Local Buffer Coalescing Logic 122. The Local Data Buffer Location Lists 120 each have multiple entries. Each entry in each one of the Local Data Buffer Location Lists 120 includes an address and a length of a buffer in Local Cache 132 that contains host data received from Host Computer(s) 100. For example, each entry in one of the Local Data Buffer Location Lists 120 may contain an address and a length of one of the Received Host Data Buffers 136 shown in Local Cache 132. The Received Host Data Buffers 136 are discontiguous buffers in Local Cache 132, each of which stores a set of host data received Host Computer(s) 100. For purposes of illustration, Received Host Data Buffers 136 are shown including Host Data Buffer 1, Host Data Buffer 2, and so on through Host Data Buffer N. Each one of the host data buffers in Received Host Data Buffers 136 may include host data received from Host Computer(s) 100 in one or more write I/O operations received from Host Computer(s) 100.

Each one of the Local Data Buffer Location Lists 120 may indicate a set of received host data buffers having a total size equal to a predetermined size. For example, the total size of the set of received host data buffers indicated by each one of the Local Data Buffer Location Lists 120 may be equal to the size of a single "track" of a physical non-volatile storage device, such as the size of a disk drive track of a disk in a disk drive, e.g. 128 kilobytes or some other predetermined value.

Local Buffer Coalescing Logic 122 is operable to receive Local Data Buffer Location Lists 120, and for each list calculate a total size of the received host data buffers indicated by the list. Local Buffer Coalescing Logic 122 then allocates a single buffer of contiguous local memory in Local Memory 104 to store the host data from the host data buffers indicated by the list, where the size of the single buffer of contiguous local memory is at least as large as a total size of the host data buffers indicated by the list. To calculate the total size of the host data buffers indicated by a list, Local Buffer Coalescing Logic 122 may sum the buffer lengths contained in the entries of the list.

For example, Local Buffer Coalescing Logic 122 may allocate Single Buffer of Contiguous Local Memory 130 to store the contents of all the buffers in Received Host Data Buffers 136 in response to one of the Local Data Buffer Location Lists 120. One or more local internal data processing operations may then be performed on the host data with at least one local data processing resource in Local Data Storage System 102 (e.g. Local DMA Circuitry 116, Local Data Compression Circuitry 112, Local Central Processing Units 110, and/or Local Network Interface Controllers 108) while using the single buffer of contiguous local memory to store the host data from the received host data buffers, as further described below.

Figure 2:
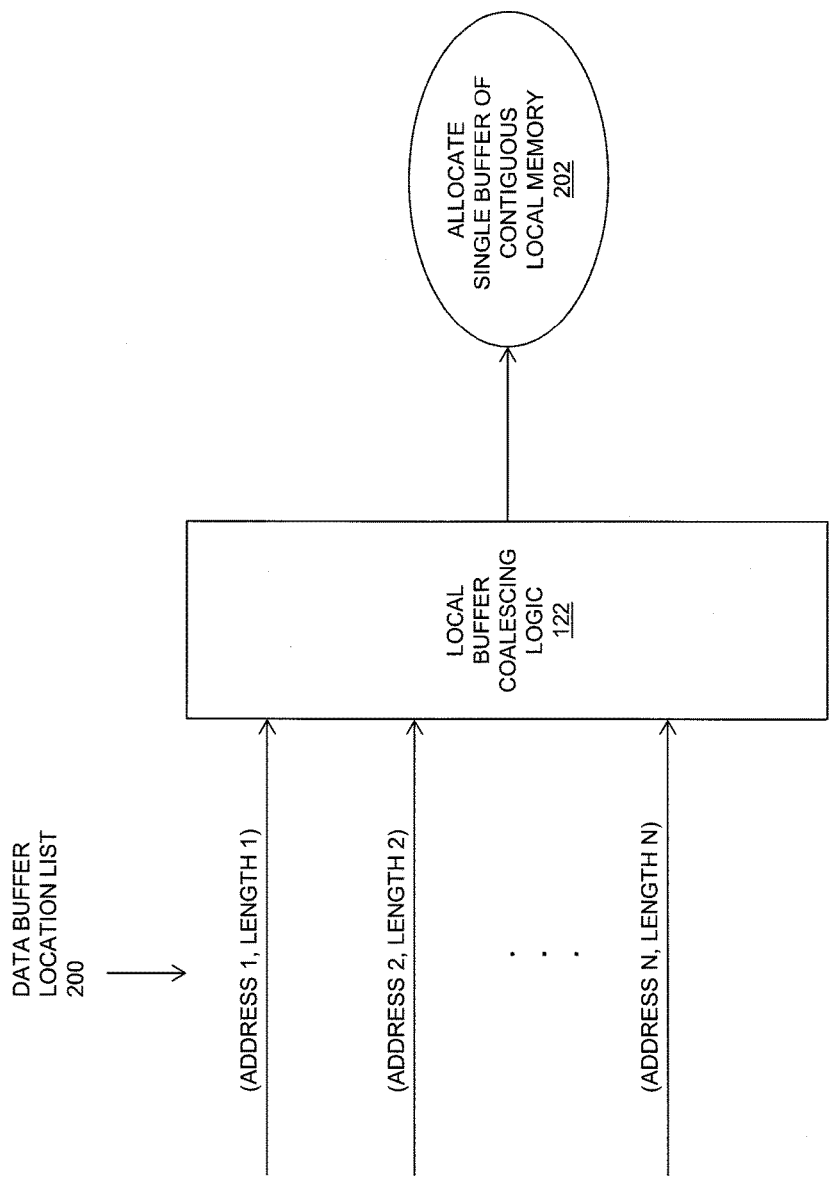
FIG. 2 is a block diagram illustrating an example of the operation of local buffer coalescing logic in some embodiments.

FIG. 2 is a block diagram illustrating an example of the operation of Local Buffer Coalescing Logic 122 in some embodiments. As shown in FIG. 2, Local Buffer Coalescing Logic 122 receives a Local Data Buffer Location List 200 that consists of multiple, entries. Each entry in the Local Data Buffer Location List 200 corresponds to a buffer containing received host data, and includes an address indicating a location of the corresponding buffer (e.g. within the Local Cache 132 of Local Data Storage System 102), and a length of the corresponding buffer. Local Buffer Coalescing Logic 122 then sums the buffer lengths in the entries of the Data Buffer Location List 200, and at 202 allocates a single buffer of contiguous local memory (e.g. Single Buffer of Contiguous Local Memory 130), having a size that is at least as large as the sum of the buffer lengths in the entries of the Data Buffer Location List 200.

Figure 3:
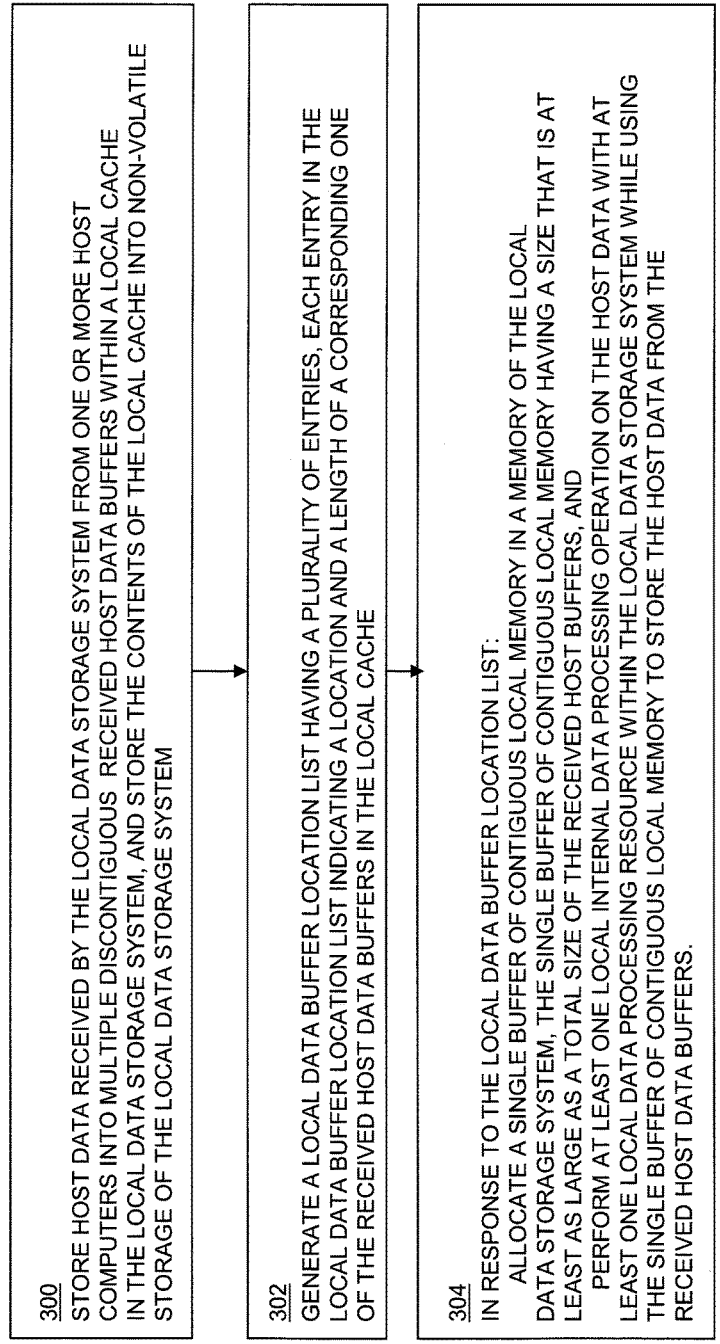
FIG. 3 is a flow chart illustrating an example of the operation of a local data storage system in some embodiments.

FIG. 3 is a flow chart illustrating an example of the operation of a local data storage system in some embodiments. The steps of FIG. 3 may, for example, be performed by components of the Local Data Storage System 102 shown in FIG. 1.

At step 300, host data received by Local Data Storage System 102 from Host Computers 100 (e.g. Host Data 140) is stored into multiple discontiguous received host data buffers within a local cache in the local data storage system, shown by Received Host Data Buffers 136 in Local Cache 132. The contents of the Received Host Data Buffers 136 is also stored into the Local Non-Volatile Storage 106 of Local Data Storage System 102, in order to persistently store the contents of the Received Host Data Buffers 136 in Local Data Storage System 102.

At step 302, Scatter Gather List Generation Logic 118 generates a local data buffer location list having a plurality of entries, e.g. one of the Local Data Buffer Location Lists 120. Each entry in the local data buffer location list generated at step 302 indicate a location and a length of a corresponding one of the Received Host Data Buffers 136 in the Local Cache 132.

In response to the local data buffer location list generated at step 302, at step 304 the Local Buffer Coalescing Logic 122 allocates Single Buffer of Contiguous Local Memory 130 in Local Memory 104. Single Buffer of Contiguous Local Memory 130 has a size that is at least as large as a total size of the Received Host Buffers 136.

Further at step 304, one or more components within the Local Data Storage System 102 perform at least one local internal data processing operation on the host data from Received Host Data Buffers 136 with at least one local data processing resource within Local Data Storage System 102, while using Single Buffer of Contiguous Local Memory 130 to store the host data from the Received Host Data Buffers 136.

For example, the local data processing resource used to perform a local data processing operation on the host data from Received Host Data Buffers 136 while using Single Buffer of Contiguous Local Memory 130 to store the host data from Received Host Data Buffers 136 may include or consist of Local DMA Circuitry 116, and the local internal data processing operation may include or consist of moving the host data from Received Host Data Buffers 136 in Local Cache 132 to Single Buffer of Contiguous Local Memory 130 using Local DMA Circuitry 116.

Moving the host data from the Received Host Data Buffers 136 in Local Cache 132 to Single Buffer of Contiguous Local Memory 130 may include indicating, based on the entries in the local data buffer location list, the locations of each one of the buffers in Received Host Data Buffers 136 in Local Cache 132 to Local DMA Circuitry 116, e.g. by Local Buffer Coalescing Logic 122 loading the addresses from the entries of the local data buffer location list from Local DMA Circuitry 116. Moving the host data from the Received Host Data Buffers 136 in Local Cache 132 to Single Buffer of Contiguous Local Memory 130 may further include indicating a location of Single Buffer of Contiguous Local Memory 130 within Local Memory 104 to Local DMA Circuitry 116, e.g. by Local Buffer Coalescing Logic 122 loading the address of Single Buffer of Contiguous Local Memory 130 within Local Memory 104 into Local DMA Circuitry 116. Moving the host data from the Received Host Data Buffers 136 in Local Cache 132 to Single Buffer of Contiguous Local Memory 130 may further include Local Buffer Coalescing Logic 122 triggering Local DMA Circuitry 116 to begin moving the host data from the Received Host Data Buffers 136 in the Local Cache 132 to the Single Buffer of Contiguous Local Memory 130.

In another example, the local data processing resource used to perform a local data processing operation on the host data from Received Host Data Buffers 136 while using Single Buffer of Contiguous Local Memory 130 to store the host data from Received Host Data Buffers 136 may include or consist of Local Data Compression Circuitry 112, and the local internal data processing operation may include or consist of compressing the host data stored within Single Buffer of Contiguous Local Memory 130 using the Local Data Compression Circuitry 112.

Compressing the host data stored within Single Buffer of Contiguous Local Memory 130 may include indicating the location of Single Buffer of Contiguous Local Memory 130 to Local Data Compression Circuitry 112, e.g. by Local Buffer Coalescing Logic 122 loading the address of Single Buffer of Contiguous Local Memory 130 into Local Data Compression Circuitry 112, and triggering Local Data Compression Circuitry 112 to begin compressing the host data in the Single Buffer of Contiguous Local Memory 130.

In another example, the local data processing resource used to perform a local data processing operation on the host data from Received Host Data Buffers 136 while using Single Buffer of Contiguous Local Memory 130 to store the host data from Received Host Data Buffers 136 may include or consist of Local Central Processing Units 110, and the local internal data processing operation may include or consist of executing Local Network Controller Module 128 on Local Central Processing Units 110 to add network header information to the host data stored in the Single Buffer of Contiguous Memory 130.

In another example, the local data processing resource used to perform a local data processing operation on the host data from Received Host Data Buffers 136 while using Single Buffer of Contiguous Local Memory 130 to store the host data from Received Host Data Buffers 136 may include or consist of Local Central Processing Units 110 and/or Local Network Interface Controllers 108, and the local internal data processing operation may include or consist of executing Local TCP/IP Stack Module 126 on Local Central Processing Units 110 to cause Local Network Interface Controller(s) 108 to perform a large send offload operation by passing an address of Single Buffer of Contiguous Memory 130 to the Local Network Interface Controller(s) 108 to cause Local Network Interface Controllers(s) 108 to i) divide the host data stored in Single Buffer of Contiguous Memory 130 into packets, and ii) transmit the packets as Transmission Units 150 to Remote Data Storage System 402. For example, Local Network Interface Controller(s) 108 may divide the host data stored in Single Buffer of Contiguous Memory 130 into packets that have a length equal to the Maximum Transmission Unit (MTU) size that can be transmitted over the network or networks that connect Local Data Storage System 102 and Remote Data Storage System 402, and accordingly Transmission Units 150 may each have a size equal to the MTU size between Local Data Storage System 102 and Remote Data Storage System 402.

FIG. 4 is a block diagram illustrating an example of a Remote Data Storage System 402. Remote Data Storage System 102 includes Remote Non-Volatile Storage 406 for persistently storing replicated host data received from Local Data Storage System 102, e.g. within the Transmission Units 150. Remote Data Storage System 402 is further shown including a Remote Memory 404, Remote Network Interface Controller(s) 408, Remote Central Processing Units 110, Remote Data Compression Circuitry 112, Remote Direct Memory Access Circuitry 116, and Remote Cache 132.

Remote Network Interface Controller(s) 108 may include or consist of one or more network interface controllers, each of which are computer hardware components connected to Remote Data Storage System 402, and through which Remote Storage System 402 receives Transmission Units 150 from the Local Data Storage System 102. Remote Network Interface Controller(s) 408 may include the ability to perform Large Receive Offload (LRO) operations that may be used to reassemble the Transmission Units 150 into a single buffer, e.g. into the Single Buffer of Contiguous Remote Memory 430, prior to passing the Transmission Units 150 to the Remote TCP/IP Stack Module 426.

Remote Central Processing Units 110 may, for example, each include or consist of one or more microprocessors, e.g. central processing units (CPUs), multi-core processors, chips, and/or assemblies, and associated circuitry.

Remote Data Compression Circuitry 412 is a computer hardware component that is operable to compress and/or decompress data stored in Remote Memory 404. Remote Data Compression Circuitry 412 may, for example, be operable to perform Lempel-Ziv-Stac (LZS) lossless data decompression on data stored in Remote Memory 404 (e.g. on host data stored in Single Buffer of Contiguous Remote Memory 430), in response to program logic stored in Remote Memory 404 and executing on one or more of the Remote Central Processing Units 410.

Remote Direct Memory Access (DMA) Circuitry 416 is a computer hardware component operable to perform a remote internal data processing operation on the host data stored in Single Buffer of Contiguous Remote Memory 430 by performing a high speed data transfer from Remote Memory 404 to Remote Cache 432, independent from Remote Central Processing Units 410. For example, Remote Buffer Coalescing Logic 422 executing on Local Central Processing Units 110 may initiate a data transfer of host data from Transmission Units 150 stored in Single Buffer of Contiguous Remote Memory 430 into Replicated Host Data Buffers 436 using Remote DMA Circuitry 416, and then subsequently receive an interrupt or other notification from Remote DMA Circuitry 416 when the data transfer is complete.

Remote Cache 432 may be embodied as a high speed data storage hardware component that is operable to initially store host data received in Transmission Units 150. The received host data initially stored in Remote Cache 432 may also be persistently stored from Remote Cache 432 into Remote Non-Volatile Storage 406.

Remote Memory 404 may include volatile memory (e.g., RAM), and/or non-volatile memory, such as one or more ROMs, disk drives, solid state drives, and the like. The Remote Central Processing Units 410 and Remote Memory 404 form control circuitry, which is constructed and arranged to carry out various methods and functions of the Remote Data Storage System 402 as described herein. Remote Memory 404 may store a variety of software components that may be provided in the form of executable program code. For example, as shown in FIG. 4, Remote Memory 404 may include software components such as Transmission Unit Processing Logic 418, Remote Buffer Coalescing Logic 422, Remote TCP/IP Stack Module 426, and Remote Network Controller Module 428. When the program code in Remote Memory 404 is executed by processing circuitry in Remote Central Processing Units 410, the processing circuitry may be caused to carry out the operations of the software components, and to carry out the methods and functions as described herein. The software components may alternatively be embodied as firmware, microcode, and/or hardware circuitry operable to carry out the methods and functions described herein. Although certain software components are shown and described for purposes of illustration and explanation, those skilled in the art will recognize that the Remote Memory 404 may additionally or alternatively include various other software components, such as an operating system, and various other applications, processes, etc.

Remote Network Controller Module 428 may be embodied as program logic operable to process Transmission Units 150 stored in Single Buffer of Contiguous Remote Memory 430 by extracting network module header information from the Transmission Units 150, and supplying the extracted network module header information to Transmission Unit Processing Logic 418. The network module header information that may be extracted from Transmission Units 150 may include i) an original size (pre-compression) of the host data stored in Transmission Units 150, ii) a size of the compressed version of the host data stored in Transmission Units 150, iii) information specific to the Local Data Storage System 102 such as a transaction number and/or connection information such as IP (Internet Protocol) addresses of the Local Data Storage System 102 and Remote Data Storage System 402, iv) mapping information metadata indicating the locations within the Remote Cache 432 into which the host data from Transmission Units 150 should be replicated, and v) CRC (Cyclic Redundancy Code) checksum(s) for the host data in Transmission Units 150.

Remote TCP/IP Stack Module 426 may be embodied as program logic operable to process the Transmission Units 150 stored in Single Buffer of Contiguous Remote Memory 430 by passing header information from the Transmission Units 150 stored in Single Buffer of Contiguous Remote Memory 430 to Remote Network Controller Module 428, after Remote Network Interface Controllers 408 performs a Large Receive Offload (LRO) operation to store the Transmission Units 150 into Single Buffer of Contiguous Remote Memory 430.

Transmission Unit Processing Logic 418 includes or consists of program logic operable to generate Transmission Unit Metadata 420 from Transmission Units 150, and to pass Transmission Unit Metadata 420 to Remote Buffer Coalescing Logic 422. The Transmission Unit Metadata 420 may include a length for each transmission unit in Transmission Units 150, and mapping information from the network module header information of Transmission Units 150 indicating the locations of replicated host data buffers in Remote Cache 432 into which the host data from Transmission Units 150 is to be stored. Remote Buffer Coalescing Logic 422 uses Transmission Unit Metadata 420 to determine a total size of the Transmission Units 150, which is a sum of all the lengths of the Transmission Units 150, as indicated in the Transmission Unit Metadata 420. Remote Buffer Coalescing Logic 422 allocates Single Buffer of Contiguous Remote Memory 430 such that the size of Single Buffer of Contiguous Remote Memory 430 is at least as large as the total size of the Transmission Units 150.

Figure 5:
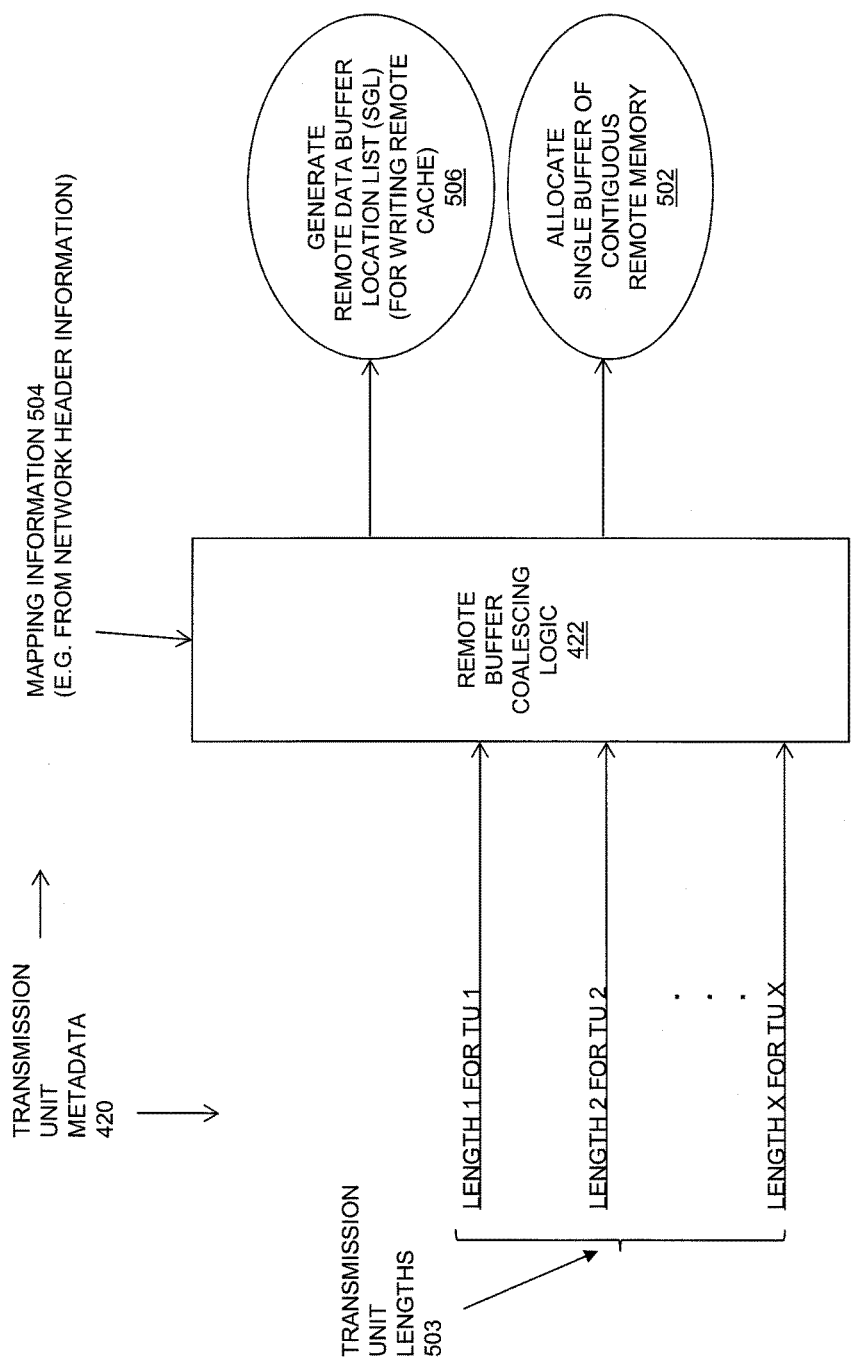
FIG. 5 is a block diagram illustrating an example of the operation of remote buffer coalescing logic in some embodiments.

FIG. 5 is a block diagram illustrating an example of the operation of Remote Buffer Coalescing Logic 422 in some embodiments. As shown in FIG. 5, Remote Buffer Coalescing Logic 422 receives Transmission Unit Metadata 420. Transmission Unit Metadata 420 may be extracted from Transmission Units 150, or may be sent separately from Local Data Storage System 102 to Remote Data Storage System 402. Transmission Unit Metadata 420 may include Transmission Unit Lengths 503, which include a length for each transmission unit in Transmission Units 150 (e.g. a length for each of TU 1 through TU X, where X is the total number of transmission units in Transmission Units 150). At 502 Remote Buffer Coalescing Logic 422 sums the lengths of the received Transmission Units 150 to find a total size of the Transmission Units 150, and allocates Single Buffer of Contiguous Remote Memory 430 such that Single Buffer of Contiguous Remote Memory 430 has a size that is at least as large as the total size of the Transmission Units 150.

Transmission Unit Metadata 420 may further include Mapping Information 504 from the network header information of the transmission units. The Mapping Information 504 may indicate the locations and sizes of the buffers within Remote Cache 432 into which the host data received in the Transmission Units 150 is to be stored as replicated host data. At 506 Remote Buffer Coalescing Logic 422 generates a remote data buffer location list that includes the location and size of each buffer within Remote Cache 432 into which the host data in Transmission Units 150 is to be written from the Single Buffer of Contiguous Remote Memory 430.

Figure 6:
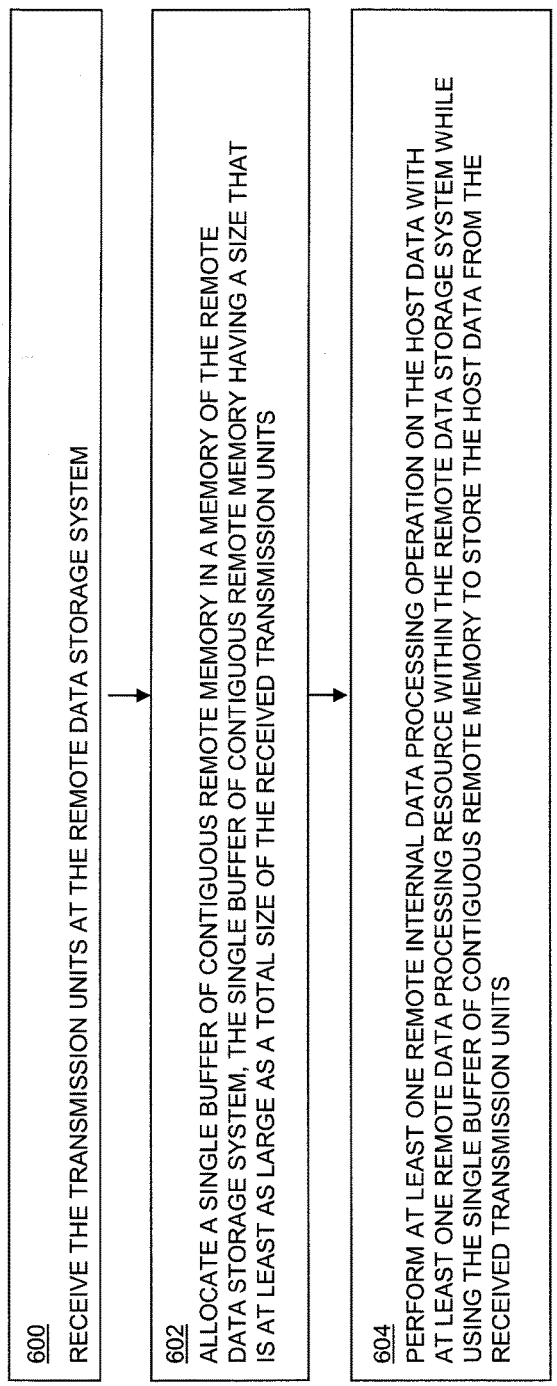
FIG. 6 is a flow chart illustrating an example of the operation of a remote data storage system in some embodiments.

FIG. 6 is a flow chart illustrating an example of the operation of a remote data storage system in some embodiments. The steps of FIG. 6 may, for example, be performed by components of the Remote Data Storage System 402 shown in FIG. 4.

At step 600, Transmission Units 150 are received by Remote Data Storage System 402 from Local Data Storage System 102.

At step 602, the Remote Buffer Coalescing Logic 422 allocates Single Buffer of Contiguous Remote Memory 430 in Remote Memory 404 to store the received Transmission Units 150. The size of Single Buffer of Contiguous Remote Memory 430 is at least as large as a total size of the received Transmission Units 150. The Transmission Units 150 may, for example, be stored into Single Buffer of Contiguous Remote Memory 430 by way of a Large Receive Offload (LRO) operations performed by Remote Network Interface Controller(s) 408.

At step 604, the Remote Data Storage System 402 performs at least one remote internal data processing operation on the host data with at least one remote data processing resource within Remote Data Storage System 402, while using Single Buffer of Contiguous Remote Memory 430 to store the host data contained within the received Transmission Units 150.

For example, the at least one remote data processing resource may include or consist of Remote Data Compression Circuitry 412, and performing the at least one remote internal data processing operation may include or consist of decompressing the host data contained in the Transmission Units 150 stored in the Single Buffer of Contiguous Remote Memory 430 using Remote Data Compression Circuitry 412.

In another example, the at least one remote data processing resource may include or consist of Remote DMA Circuitry 430, and Remote Buffer Coalescing Logic 422 may generate, from mapping information in the Transmission Unit Metadata 420, a remote data buffer location list having multiple entries, each entry in the remote data buffer location list indicating a location and a length of one of the Replicated Host Data Buffers 436 within Remote Cache 432 into which the replicated host data from the Transmission Units 150 is to be stored. The replicated host data in the Replicated Host Data Buffers 436 may also be persistently stored into Remote Non-Volatile Storage 406, in order to persistently store the host data from Transmission Units 150 in the Remote Data Storage System 402. The at least one remote internal data processing operation may further include or consist of moving the host data from the Single Buffer of Contiguous Remote Memory 430 to the Replicated Host Data Buffers 436, based on the entries in the remote data buffer location list, using the Remote DMA Circuitry 416.

As will be appreciated by one skilled in the art, aspects of the technologies disclosed herein may be embodied as a system, method or computer program product. Accordingly, each specific aspect of the present disclosure may be embodied using hardware, software (including firmware, resident software, micro-code, etc.) or a combination of software and hardware. Furthermore, aspects of the technologies disclosed herein may take the form of a computer program product embodied in one or more non-transitory computer readable storage medium(s) having computer readable program code stored thereon for causing a processor and/or computer system to carry out those aspects of the present disclosure.

Any combination of one or more computer readable storage medium(s) may be utilized. The computer readable storage medium may be, for example, but not limited to, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any non-transitory tangible medium that can contain, or store a program for use by or in connection with an instruction execution system, apparatus, or device.

The figures include block diagram and flowchart illustrations of methods, apparatus(s) and computer program products according to one or more embodiments of the invention. It will be understood that each block in such figures, and combinations of these blocks, can be implemented by computer program instructions. These computer program instructions may be executed on processing circuitry to form specialized hardware. These computer program instructions may further be loaded onto a computer or other programmable data processing apparatus to produce a machine, such that the instructions which execute on the computer or other programmable data processing apparatus create means for implementing the functions specified in the block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block or blocks.

Those skilled in the art should also readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); or (b) information alterably stored on writable storage media (e.g. floppy disks and hard drives).

While the invention is described through the above exemplary embodiments, it will be understood by those of ordinary skill in the art that modification to and variation of the illustrated embodiments may be made without departing from the inventive concepts herein disclosed.

What is claimed is:

1. A method of performing host data replication between a local data storage system and a remote data storage system, comprising:

storing host data received by the local data storage system from one or more host computers into a plurality of discontiguous received host data buffers within a local cache in the local data storage system, wherein contents of the host data buffers within the local cache is also stored into non-volatile storage of the local data storage system to persistently store the contents of the host data buffers in the local data storage system;

generating a local data buffer location list having a plurality of entries, wherein each entry in the local data buffer location list indicates a location and a length of a corresponding one of the received host data buffers in the local cache; and in response to the local data buffer location list:
  allocating a single buffer of contiguous local memory in a memory of the local data storage system, wherein the single buffer of contiguous local memory has a size that is at least as large as a total size of the received host buffers, and
  performing at least one local internal data processing operation on the host data with at least one local data processing resource within the local data storage system while using the single buffer of contiguous local memory to store the host data from the received host data buffers.

2. The method of claim 1, wherein the at least one local data processing resource includes local direct memory access circuitry coupled to the local cache and the memory of the local data storage system, and wherein the at least one local internal data processing operation includes moving the host data from the host data buffers in the local cache to the single buffer of contiguous local memory using the local direct memory access circuitry.

3. The method of claim 2, wherein moving the host data from the host data buffers in the local cache to the single buffer of contiguous local memory includes i) indicating, responsive to the entries in the local data buffer location list, the locations of the received host data buffers in the local cache to the local direct memory access circuitry, ii) indicating a location of the single buffer of contiguous local memory in the memory of the local data storage system to the local direct memory access circuitry, and iii) triggering the local direct memory access circuitry to begin moving the host data from the received host data buffers in the local cache to the single buffer of contiguous local memory.

4. The method of claim 3, wherein the at least one local data processing resource includes local data compression circuitry coupled to the memory of the local data storage system, and wherein the at least one local internal data processing operation includes compressing the host data in the single buffer of contiguous local memory using the local data compression circuitry.

5. The method of claim 4, wherein compressing the host data in the single buffer of contiguous local memory includes i) indicating the location of the single buffer of contiguous local memory in the memory of the local data storage system to the local data compression circuitry coupled to the memory of the local data storage system, and ii) triggering the local data compression circuitry to begin compressing the host data in the single buffer of contiguous local memory.

6. The method of claim 5, wherein the at least one local data processing resource includes at least one local central processing unit, and wherein the at least one local internal data processing operation includes executing a network controller module on the local central processing unit to add network header information to the host data in the single buffer of contiguous memory in the memory of the local data storage system, wherein the network header information includes mapping information indicating locations within a remote cache of the remote data storage system into which the host data is to be stored.

7. The method of claim 6, wherein the at least one local data processing resource further includes a local network interface controller, and wherein the at least one local internal data processing operation includes executing a TCP/IP module on the local central processing unit to cause a large send offload operation to be performed by a local network interface card in the local data storage system by passing the single buffer of contiguous memory to the local network interface controller to cause the local network interface controller to i) divide the host data stored in the single buffer of contiguous memory into packets, and ii) transmit the packets as transmission units to the remote data storage system.

8. The method of claim 6, further comprising:
  receiving the transmission units by the remote data storage system;
  allocating a single buffer of contiguous remote memory in a memory of the remote data storage system, wherein the single buffer of contiguous remote memory has a size that is at least as large as a total size of the received transmission units; and
  performing at least one remote internal data processing operation on the host data with at least one remote data processing resource within the remote data storage system while using the single buffer of contiguous remote memory to store the host data contained within the received transmission units.

9. The method of claim 8, wherein the at least one remote data processing resource includes remote data compression circuitry coupled to the memory of the remote data storage system, and wherein the at least one remote internal data processing operation includes decompressing the host data in the single buffer of contiguous remote memory using the remote data compression circuitry.

10. The method of claim 9, wherein the at least one remote data processing resource includes remote direct memory access circuitry coupled to the remote cache and the memory of the remote data storage system, and further comprising:
  generating, at the remote data storage system from mapping information in transmission unit metadata, a remote data buffer location list having a plurality of entries, wherein each entry in the remote data buffer location list indicates a location and a length of a buffer within the remote cache of the remote data storage system into which the replicated host data is to be stored, and wherein the replicated host data in the remote cache is also stored into non-volatile storage of the remote data storage system to persistently store the replicated host data on the remote data storage system; and
  wherein the at least one remote internal data processing operation includes moving the host data from the single buffer of contiguous remote memory to the locations within the remote cache of the remote data storage system into which the replicated host data is to be stored, responsive to the entries in the remote data buffer location list, using the remote direct memory access circuitry.

11. A system for replicating host data, comprising:
  a local data storage system having processing circuitry and at least one memory with program code stored thereon for execution on the processing circuitry, wherein the local data storage system is configured and arranged to:
    store host data received by the local data storage system from one or more host computers into a plurality of discontiguous received host data buffers within a local cache in the local data storage system, wherein contents of the host data buffers within the local cache is also stored into non-volatile storage of the local data storage system to persistently store the contents of the host data buffers in the local data storage system;
    generate a local data buffer location list having a plurality of entries, wherein each entry in the local data buffer location list indicates a location and a length of a corresponding one of the received host data buffers in the local cache; and in response to the local data buffer location list:

allocate a single buffer of contiguous local memory in a memory of the local data storage system, wherein the single buffer of contiguous local memory has a size that is at least as large as a total size of the received host buffers, and perform at least one local internal data processing operation on the host data with at least one local data processing resource within the local data storage system while using the single buffer of contiguous local memory to store the host data from the received host data buffers.

12. The system of claim 11, wherein the at least one local data processing resource includes local direct memory access circuitry coupled to the local cache and the memory of the local data storage system, and wherein the local data storage system is further configured and arranged to perform the at least one local internal data processing operation at least in part by moving the host data from the host data buffers in the local cache to the single buffer of contiguous local memory using the local direct memory access circuitry.

13. The system of claim 12, wherein the local data storage system is further configured and arranged to move the host data from the host data buffers in the local cache to the single buffer of contiguous local memory at least in part by i) indicating, responsive to the entries in the local data buffer location list, the locations of the received host data buffers in the local cache to the local direct memory access circuitry, ii) indicating a location of the single buffer of contiguous local memory in the memory of the local data storage system to the local direct memory access circuitry, and iii) triggering the local direct memory access circuitry to begin moving the host data from the received host data buffers in the local cache to the single buffer of contiguous local memory.

14. The system of claim 13, wherein the at least one local data processing resource includes local data compression circuitry coupled to the memory of the local data storage system, and wherein the local data storage system is further configured and arranged to perform the at least one local internal data processing operation at least in part by compressing the host data in the single buffer of contiguous local memory using the local data compression circuitry.

15. The system of claim 14, wherein the local data storage system is further configured and arranged to compress the host data in the single buffer of contiguous local memory at least in part by i) indicating the location of the single buffer of contiguous local memory in the memory of the local data storage system to the local data compression circuitry coupled to the memory of the local data storage system, and ii) triggering the local data compression circuitry to begin compressing the host data in the single buffer of contiguous local memory.

16. The system of claim 15, further comprising:

a remote data storage system having processing circuitry and at least one memory with program code stored thereon for execution on the processing circuitry; and wherein the at least one local data processing resource includes at least one local central processing unit, and wherein the local data storage system is further configured and arranged to perform the at least one local internal data processing operation at least in part by executing a network controller module on the local central processing unit to add network header information to the host data in the single buffer of contiguous memory in the memory of the local data storage system, wherein the network header information includes mapping information indicating locations within a remote cache of the remote data storage system into which the host data is to be stored.

17. The system of claim 16, wherein the at least one local data processing resource further includes a local network interface controller, and wherein the local data storage system is further configured and arranged to perform the at least one local internal data processing operation at least in part by executing a TCP/IP module on the local central processing unit to cause a large send offload operation to be performed by a local network interface card in the local data storage system by passing the single buffer of contiguous memory to the local network interface controller to cause the local network interface controller to i) divide the host data stored in the single buffer of contiguous memory into packets, and ii) transmit the packets as transmission units to the remote data storage system.

18. The system of claim 16, wherein the remote data storage system is configured and arranged to:

receive the transmission units;

allocate a single buffer of contiguous remote memory in the memory of the remote data storage system, wherein the single buffer of contiguous remote memory has a size that is at least as large as a total size of the received transmission units; and perform at least one remote internal data processing operation on the host data with at least one remote data processing resource within the remote data storage system while using the single buffer of contiguous remote memory to store the host data contained within the received transmission units.

19. The system of claim 18, wherein the at least one remote data processing resource includes remote data compression circuitry coupled to the memory of the remote data storage system, and wherein the remote data storage system is further configured and arranged to perform the at least one remote internal data processing operation at least in part by decompressing the host data in the single buffer of contiguous remote memory using the remote data compression circuitry.

20. The system of claim 19, wherein the at least one remote data processing resource includes remote direct memory access circuitry coupled to the remote cache and the memory of the remote data storage system, and wherein the remote data storage system is further configured and arranged to:

generate, from mapping information in transmission unit metadata, a remote data buffer location list having a plurality of entries, wherein each entry in the remote data buffer location list indicates a location and a length of a buffer within the remote cache of the remote data storage system into which the replicated host data is to be stored, and wherein the replicated host data in the remote cache is also stored into non-volatile storage of the remote data storage system to persistently store the replicated host data on the remote data storage system; and perform the at least one remote internal data processing operation at least in part by moving the host data from the single buffer of contiguous remote memory to the locations within the remote cache of the remote data storage system into which the replicated host data is to be stored, responsive to the entries in the remote data buffer location list, using the remote direct memory access circuitry.

21. A computer program product, comprising:
- at least one non-transitory computer readable medium storing program code for, the program code, when executed by processing circuitry, causing the processing circuitry to perform the steps of:
- storing host data received by the local data storage system from one or more host computers into a plurality of discontiguous received host data buffers within a local cache in the local data storage system, wherein contents of the host data buffers within the local cache is also stored into non-volatile storage of the local data storage system to persistently store the contents of the host data buffers in the local data storage system;
- generating a local data buffer location list having a plurality of entries, wherein each entry in the local data buffer location list indicates a location and a length of a corresponding one of the received host data buffers in the local cache; and
- in response to the local data buffer location list:
  - allocating a single buffer of contiguous local memory in a memory of the local data storage system, wherein the single buffer of contiguous local memory has a size that is at least as large as a total size of the received host buffers, and
  - performing at least one local internal data processing operation on the host data with at least one local data processing resource within the local data storage system while using the single buffer of contiguous local memory to store the host data from the received host data buffers.

* * * * *